Patented Mar. 7, 1939

2,149,876

UNITED STATES PATENT OFFICE 2,149,876

SOLUBLE COFFEE PRODUCT AND METHOD OF PREPARING SAME

Gerald L. Wendt, New York, and Douglas Fronmuller, Middle Village, Long Island, N. Y., assignors to Coffee Products Corporation, New York, N. Y., a corporation of New York No Drawing. Application June 15, 1934, Serial No. 730,752

7 Claims. (Cl. 99—71)

This invention relates to improvements in soluble coffee preparations, and includes an improved powdered soluble coffee product, and an improved method of producing such a product. More particularly the invention relates to the production of a roasted soluble coffee product from green unroasted coffee beans, and to an improved product so obtained.

The new powdered coffee product is a stable, non-hygroscopic solid product of high density and high concentration, having desirable keeping qualities, representing a high percentage of the coffee extracted and having other desirable properties. The product represents, for example, about 20% of the weight of the green coffee beans from which it is prepared. The product is readily and completely soluble in hot water, and has a high strength such that, for example, only about one gram or somewhat less is required for a cup of coffee. The product is free from objectionable hygroscopic properties and also from any case-hardened properties which interefere with ready and complete solubility in hot water. The product is advantageously free or substantially so from oils and fats which tend to become rancid when the product is kept. Solutions of the product have a high pH value, for example, between about 6.1 and 6.7. The nature, properties and advantages of the new product will more fully appear from the following more detailed description.

The improved process of the present invention includes the extraction of the ground green coffee beans and treatment of the resulting extract to remove therefrom the greater part or all of the fats and oils, as well as proteins, etc., which are undesirable in the final product, followed by concentration of the extract to produce a concentrated solution or extract, the combining of the final evaporation of the water with the roasting of the product by subjecting the concentrated extract, in thin layers, to a high temperature which affects rapid removal of the remainder of the water and roasting, and the cooling of the roasted product, the roasting and cooling being carried out in an atmosphere of regulated humidity.

It has been known for many years that ground green coffee beans could be extracted with boiling water, and the purified extract purified and filtered, and the extract then evaporated to dryness and roasted to give a dry coffee extract. The process of the present invention is an improvement on such processes in its method of purifying the extract before concentrating, in its concentration of the extract to produce a concentrated extract without evaporating to dryness, in its combination of the final drying with the roasting operation, and in the carrying out of the roasting and the cooling of the roasted product in an atmosphere of regulated humidity.

The process will be illustrated by the following more detailed description.

Whole raw green coffee beans are first cleaned to remove extraneous material, hulls, etc., and are then, without further treatment, ground in an attrition mill to any convenient fineness, depending on the means of extraction to be later employed, preferably to between 8 and 20 mesh fineness. The grinding of the beans is facilitated if the beans are first thoroughly dried at a temperature of around 212° F. or higher, whereupon the beans become brittle and can be ground in an ordinary coffee mill; but such preliminary drying is usually accompanied with a considerable and undesirable loss of certain volatile flavoring materials which are desirable to retain for the final product and which are easily lost in the processes of grinding, extraction and evaporation if they are produced at this stage of the process, particularly if the drying is accompanied with incipient roasting as indicated by the change of the color of the beans to a light brown color. The beans can, however, be ground without such preliminary drying, by the use of attrition mills. Whereas the preliminary drying of the green coffee beans may result in a very substantial shrinkage or loss in weight, for example, of as much as 8 to 12%, the grinding of the raw green and undried beans results in retaining desirable flavoring materials which are liable to be lost if the beans are first dried before grinding.

The ground raw green beans are then extracted with hot water much as ordinary roasted coffee is extracted with hot water to make an infusion. This extraction can be carried out in various ways. Boiling water may be allowed to trickle through a mass of the ground raw beans suspended on a filter cloth, using, for example, 10 pounds of water for each pound of ground beans. When this amount of water has been run over the beans, the solution may be boiled for several minutes in contact with the beans still suspended in the filter cloth, when the production of the infusion is finished.

The extraction of the ground beans can also be carried out by immersing the ground raw beans in a tank of boiling water violently agitated by means of a stirrer and by then separating the ground beans from the resulting infusion by simple filtration. Or the ground beans can be extracted in a countercurrent extractor in which boiling water is sprayed or percolated into the top of the extraction tower and caused to trickle down through successive trays or layers, such as trays containing relatively thin layers of the ground raw coffee beans. For example, the trays may be so arranged that they rise vertically through the tower, a tray of fresh beans being added at the bottom when a tray of exhausted grounds is removed at the top.

A number of devices and procedures can be followed or used for extracting the ground raw coffee beans with hot or boiling water, including countercurrent devices and methods such as are used for extracting other materials.

The infusion obtained by the extraction of the ground raw beans is green in color and cloudy. It contains fine dust consisting of finely ground raw bean particles. It also contains fats and oils in the form of an emulsion which have been separated from the beans by the action of the hot water. It also contains in finely divided form albuminoids or proteins or protein-like materials which have also been washed from the raw beans and which may be present largely in an uncoagulated state, although coagulation to a greater or less extent or completely may occur where the extraction is carried out with boiling water for a sufficient period of time. It is not, however, necessary that these materials should be coagulated by heat treatment, since the improved process of the present invention enables them to be removed, along with oils, by treatment of the extract after it is prepared.

It will usually be desirable to subject the extract to filtration to remove suspended material, before further treatment, although such filtration can be omitted. When the extract is filtered at this stage, an ordinary filter press may be used, and the filtering action is promoted by the addition of finely divided filter-aids with the result that finely ground portions of the green coffee beans can be completely removed, and fats and proteins can be removed to a greater or less extent, without clogging of the filter press with the somewhat pasty material. For instance, the filter cloth of the filter press may have a pre-coat of super-cel put on before the filtration, using about one-tenth of a pound of the super-cel per square foot of filter surface. A further amount of filter-aid, composed for example, of 25% Hyflo filter-cel, and 75% super-cel, is then added to the coffee infusion and stirred into it, using about 40 grams of this mixture for each gallon of the infusion, or about one pound for each ten gallons. When the infusion, after intimate admixture of the filter-aids, is subjected to filtration, there results a light-green colored infusion containing about 2% of dissolved constituents, dissolved from the green beans.

This preliminary filtration, even with the addition of filter-aids, may not completely remove the emulsified fats and oils and all of the proteins and protein-like substances from the solution, particularly where the proteins have not been coagulated during the extraction with boiling water. These proteins can be coagulated by heat treatment of the solution, but we desire to avoid the application of heat so far as possible in order to avoid those reactions which take place at high temperatures and through which the infusion acquires a brownish color and develops a coffee flavor.

We have found that uncoagulated proteins, contained in a more or less colloidal state in the infusion, together with emulsified fats and oils, can be removed by treating the infusion with finely divided adsorbent materials such as activated charcoal, activated alumina, fuller's earth, bentonite, etc. These materials, when allowed to come into contact with the solution, adsorb the proteins and protein-like substances on their active surfaces so that they do not pass on with the infusion to the later stages of the process, and at the same time these adsorbents remove oils and fats so that no separate treatment is necessary to remove them.

The treatment of the infusion by means of adsorbents may be carried out in a number of ways. For example, finely divided activated alumina may be added to the still hot infusion, or to the infusion heated to a temperature of about 200° F., using, for example, about 80 grams of activated alumina per gallon of infusion, and agitating the infusion for a sufficient time, for example, half an hour or so, until the adsorption is substantially completed. The amount of the activated alumina or other finely divided adsorbents, as well as the temperature and time required for completing the adsorption will vary with different adsorbents and different solutions, depending somewhat, for example, on the extent to which the proteins or protein-like materials have been coagulated during the extraction of the coffee and the amount of such materials and of oils and fats which remain in the solution after the first filtration. Where the infusion is not first filtered, a larger amount of adsorbent is needed and, in the interests of economy, the infusion is desirably first filtered before the addition of the finely divided adsorbent, so that less of the protein-like materials and of the oils and fats will remain to be removed by this treatment.

The adsorbent may also be used by allowing the infusion to trickle slowly through a deep layer of the granular activated alumina or other material maintained at a suitable temperature, for example, around 200°, at which temperature the still hot infusion may be trickled or percolated therethrough. It will be evident that different methods are available for securing the necessary intimacy of contact, between the adsorbent and the proteins and oils and fats contained in the solution.

After such treatment the infusion is again filtered in a standard filter press with the use of filter-aids on the filter cloth and with the use of added filter-aids to the solution, where the amount of the adsorbent material is not sufficient. This filtration removes the adsorbent material with the adsorbed proteins and protein-like material and with the adsorbed oils and fats, giving a clear filtrate or infusion free from constituents which if not removed, would give insoluble or undesirable constituents in the final product. This treatment insures the removal of substantially all of the albumens from the extract, and precludes the presence of albumens or their decomposition products in the soluble coffee product.

The clear infusion is then evaporated in a vacuum evaporator, preferably operating at the highest attainable vacuum, in order to reduce to a minimum the temperature of the infusion during evaporation. Evaporation is continued until the solution has been concentrated to about onetwelfth to one-fifteenth of its original volume and has attained a concentration of around 25 to 30% in dissolved materials.

If, for instance, the raw green beans are originally extracted with ten pounds of water for each pound or ground beans, there will be produced about 1.2 gallons of an infusion containing about 2% of dissolved material. That is, around 20% or more of the raw green beans is extracted, giving about one-fifth of a pound or somewhat more of extracted material for each pound of beans extracted, and this amount of material in ten pounds of water (used for each pound of ground beans) will give about a 2% extract or infusion. After filtration, adsorption and refiltration, and evaporation, the extract or infusion will have a much higher content of dissolved material, for example, around 25 to 30%, and a specific gravity of about 1.07.

The evaporation of this solution is not carried to dryness, but is advantageously stopped when a concentrated solution is produced. This solution is now ready for the final evaporation and drying which is combined with the roasting or baking as a part of the same continuous operation. After the water is driven off by heating the solution above its boiling point, the dry residue is immediately roasted or baked at a temperature that is high enough to cause roasting, i. e. to cause a conversion of the extracted materials into actual coffee flavor.

It is important for the control of the flavor of the final product, and for the production of a non-hygroscopic product, that this roasting or baking be conducted at very carefully regulated temperatures, and for a carefully controlled short period of time, and in an atmosphere of regulated humidity. The time required varies from about one to five minutes or somewhat less, depending on the temperature used and on the coffee flavor desired. It is important that every particle of the extract be subjected to the proper roasting or baking temperature and for a similar period of time. If the heat for this baking or roasting is applied through heated surfaces from which the heat must be transferred to a considerable body of the material, through transfer of heat from one portion of the material to another, undesirable over-roasting and under-roasting of different parts of the material is likely to occur, and difficult if not impossible to avoid.

In order to avoid over-roasting and under-roasting and to insure that all parts of the material are properly roasted, and also to insure the production of a soluble non-hygroscopic product, the concentrated extract is applied in the form of thin films from which the water is immediately removed by the high temperature to which the film is subjected, that is, the roasting temperature, after which roasting rapidly takes place of the entire amount of material remaining in the thin layer, after the water is removed, and in an atmosphere of regulated humidity obtained by confining part of the water vapors given off during the drying operation. In the present process the removal of water is effected in such a thin layer, and the baking or roasting is then effected by subjecting the resulting very thin film to heat at an accurately regulated temperature and during an accurately controlled period of time, and in a humid atmosphere.

The surface to which the thin layer of the concentrated extract is applied, and on which the final evaporation and roasting takes place, is heated to and kept at a predetermined temperature, for example, by circulating oil of constant and predetermined temperature in contact with it by means of a high speed pump, and heating the oil, for example, in a coil, by a gas flame, with thermostatic control of the gas flame and of the temperature of the rapidly circulating oil. The humidity of the atmosphere is obtained by confining part of the water vapor given off by the drying operation.

The temperature employed for the roasting will range from about 350° F. to about 450° F. and the most useful range is between 375° F. and 425° F. The time required is dependent on the temperature, being in general less when the temperature is higher. For instance, approximately the same results are obtained by baking the product for five minutes at about 375° F. and for about three minutes at 425° F., these temperatures being those of the hot oil by which the hot metal surface, on which the thin film of material is roasted, is heated. The flavor of the product can be varied by control of the heat treatment or roasting, ranging from the flavor of light roasted to the flavor of a very dark or "French-roast" product.

When the roasting or baking operation is complete, and the product is ready for removal from the source of heat, it is in the form of a sticky plastic paste, that is, a very thin film of sticky plastic material. On cooling to only a relatively small extent, for example, through a range of 20 or 30° F. or more, this product is converted to an extremely brittle brown film which is readily pulverized to give a powder and which can be removed from the metal surface by simple scraping or by brushing. This cooling treatment will follow promptly after the roasting operation; since the thin film should be promptly removed from the high temperature, and the material cooled, as soon as the roasting has been carried to the desired extent.

The final cooling of the plastic film to convert it into a solid product is carried out, according to the present invention, in an atmosphere of regulated humidity, which is also maintained during the roasting operation, for example, by confining the thin film so that the steam evolved during the drying of the concentrated liquid will be present to cause humidity in the surrounding atmosphere in which the roasting and subsequent cooling take place.

We have found that if regulated humidity of the surrounding atmosphere is not maintained, and if the material is roasted and completely dried by heating to 375° F. to 425° F. in a dry atmosphere, the product tends to become case-hardened so that it is not readily wetted by liquid water, and goes into solution with considerable difficulty. The surface has little or no attraction for water and, when the product is stirred into a cup of hot water, it tends to gather in unwetted lumps and go into solution with difficulty.

We have found, however, that this surface condition of the material can be modified by roasting, and then cooling the pasty material, after roasting, in a humid atmosphere, such as an atmosphere containing from 25 to 50% of steam and only 75 to 50% of air. If the roasting and subsequent cooling are carried out in such a humid atmosphere, the paste cools to a brittle solid without case-hardening or resistance to wetting, so that the final product dissolves in hot water almost instantly. Nevertheless, a product produced and cooled in this way does not take up moisture from the atmosphere and is a substantially non-hygroscopic product. The cooled product, when pulverized, therefore is a non-hygroscopic product which will not take up water from the atmosphere, and therefore remains in a dry pulverized condition, but nevertheless dissolves in hot water almost instantly, when used to make a cup of coffee.

In the carrying out of the process the metal surfaces on which the thin layer of concentrated extract is placed, and on which regulated roasting occurs, followed by cooling, and with maintenance of proper conditions of humidity, may be in the fore of a series of stationary or movable trays which are immersed in or caused to pass through and are heated by an oil bath or a metal bath; or it may be a rotary drum which is heated internally to a predetermined and carefully regulated temperature by circulation of hot oil; or it may be an endless belt on which the thin layer of concentrated extract flows continuously in the form of a thin layer, and which metal belt then passes through a heated zone where it is heated to the roasting temperature to cause rapid removal of water and regulated roasting of the product, followed by passing through a cooling chamber to solidify the product, and with regulated humidification of the atmosphere during the operation.

The obtaining of an atmosphere of proper humidity is readily accomplished by enclosing the apparatus where the final drying, roasting and final cooling takes place, so that the steam evolved from the final drying operation will supply a humid atmosphere during the roasting and subsequent cooling operation. Thus the plates, trays, cylinders, or endless belts, etc., on which the final drying and baking take place, may be covered with a shallow box-like cover to retain part of the steam formed in the final evaporation, and this steam used to provide the humid atmosphere during the roasting and while the tray, hot plate, or cylinder, etc., are permitted to cool to solidify the product, for example, from roasting temperature to a temperature 20 to 30° F. lower.

The product produced by the present process has many advantages. It is readily and completely and almost instantly soluble in hot water. Nevertheless, it does not absorb moisture from the atmosphere and remains dry, brittle and pulverulent. Tests made with the product at temperatures as high as 104° F. and with air saturated with water vapor showed substantially no absorption of water; whereas commercial coffee powders made by extracting roasted coffee showed pronounced water absorption and hygroscopic properties.

The water content of the new product is low, and remains practically constant. Owing, doubtless, to the regulated humidity under which product is roasted and then cooled and solidified, it contains a fraction of a percent of water. In the case of a number of samples of the product, which have stood exposed to the air or in a loosely closed glass jar for considerable periods of time, the water was found to be only around 0.43%, and in general less than about ½%; whereas commercial coffee powders, made from roasted coffee, showed a marked increase in water content under similar conditions.

Another characteristic of the new product is its freedom from rancidity, or from a tendency to become rancid, due to oils or fats; since the present process effects complete or substantially complete removal of oils and fats. The presence of oils and fats in commercial coffee extracts seems to be largely responsible for the alien or stale flavor which these extracts acquire on keeping after a sealed can is opened. The tendency toward rancidity is doubtless promoted by the absorption of water by the hygroscopic extracts, and the resulting combined action of water and air on the oils and fats contained in the extracts. The freedom from hygroscopic properties, combined with the small amount or substantially complete absence of oils and fats, makes the new product a stable product, free or substantially so from any tendency to become rancid on keeping.

The freedom from rancidity of the new product is reflected in the high hydrogen ion concentration of the solution made with it. In general we have found the pH value of solutions of the new product to be around 6.3, or within the range of about 6.1 to 6.7.

Another characteristic of the new product is its high specific gravity, i. e., the fact that it is composed of solid heavy crystals, and is not nearly as fluffy or porous as commercial coffee powders made from roasted coffee beans. Expressing this characteristic in terms of bulk weight of a certain definite volume of the powder as ordinarily packed, we have observed a weight of about 0.529 gram per cubic centimeter or about 33.2 pounds per cubic foot of the product.

A further characteristic of the new product is that it is much more powerful in coffee flavor than products made from roasted coffee beans and now on the market. In actual tests, it was found that one gram of the new product makes a satisfactory cup of coffee, comparable in strength with a similar cup of coffee made from two grams of a commercial coffee powder made from roasted coffee beans.

A further characteristic of the new product is that it represents a high percentage of the green coffee beans extracted, being usually around 20%. In the case of powders made from roasted coffee, there is a considerable loss in the roasting operation, and the weight of the powder made from the roasted beans is only around 8½% of the weight of the original green coffee.

The nature and advantages of the new product, and the importance of this product, will be illustrated by comparing it with ordinary coffee, from which coffee is made by the housewife or in a restaurant, and with a commercial extract made from roasted coffee. Ordinary ground coffee gives from 2800 to 4000 cups of coffee per 100 pounds, as ordinarily made. A commercial coffee powder made from roasted coffee, amounting to about 8½ pounds of powder from 100 pounds of green coffee beans, gives about 2125 cups of coffee. The new product of the present invention, amounting to about 20 pounds of powder from 100 pounds of beans, gives about 12,000 cups of coffee of comparable strength with those produced either from ordinary roasted and ground coffee, or from the commercial powders made from roasted coffee above referred to.

The present invention thus provides an improved process for making coffee products from raw unroasted coffee beans; and provides a new and improved coffee product having many advantages, such as those above referred to, and adapted for use not only for making coffee for beverage purposes, but in flavorings, for making milk shakes, ice cream, gelatin, candy and other products.

We claim:

1. The improvement in the production of solid coffee products from green unroasted coffee beans which comprises subjecting a purified extract from such beans to evaporation to produce a concentrated extract and combining the removal of water from said concentrated extract with the roasting of the product by supplying the concentrated extract in the form of a thin layer to surfaces heated to the roasting temperature, whereby the water is rapidly removed from the concentrated extract and the product thereafter rapidly roasted.

2. The improvement in the roasting of coffee extracts from green unroasted coffee beans which comprises removing water from the purified extracts, carrying out the roasting operation while the material is in a thin layer which is rapidly heated to the roasting temperature, and cooling the roasted product in an atmosphere of regulated humidity.

3. The further improvement in the process of the preceding claim in which both the roasting and the cooling and solidification of the product are carried out in an atmosphere of regulated humidity.

4. The improvement in the production of a roasted product from green unroasted coffee beans which comprises producing and purifying an extract of such beans, evaporating the extract to produce a concentrated extract, supplying the concentrated extract in the form of a thin layer to a surface heated to the roasting temperature to effect rapid removal of water therefrom and rapid roasting of the resulting product, and maintaining a regulated humidity of the atmosphere surrounding said product during the roasting of such product.

5. The improvement in the production of a roasted product from green unroasted coffee beans which comprises producing and purifying an extract of such beans, evaporating the extract to produce a concentrated extract, supplying the concentrated extract in the form of a thin layer to a surface heated to the roasting temperature to effect rapid removal of water therefrom and rapid roasting of the resulting product, and maintaining a regulated humidity of the atmosphere surrounding said product during the cooling of the roasted product, and also during the roasting of such product.

6. The method of producing a coffee extract from raw unroasted coffee beans which comprises extracting the beans with hot water, purifying the resulting hot extract by the addition of adsorbent material capable of adsorbing suspended constituents, separating the resulting purified extract from the adsorbent material and suspended constituents adsorbed thereby, evaporating the resulting solution to produce a concentrated extract, supplying the concentrated extract in the form of a thin layer to surfaces heated to the roasting temperature and thereby rapidly removing water therefrom and roasting the same, and regulating the roasting and subsequent cooling of the roasted product by maintaining a regulated humidity in the atmosphere surrounding said product to produce a roasted and cooled product readily soluble in hot water and substantially free from hygroscopic properties.

7. The improvement in the production of roasted products from green unroasted coffee beans, which comprises extracting raw coffee beans with hot water, evaporating the resulting extract to produce a syrup, and subjecting the resulting syrup to a combined rapid drying and roasting treatment, the insoluble constituents, including fats and oils, being removed from the extract prior to the drying and roasting treatment.

GERALD L. WENDT.
DOUGLAS FRONMULLER.

CERTIFICATE OF CORRECTION.

Patent No. 2,149,876.   March 7, 1939.

GERALD L. WENDT, ET AL.

It is hereby certified that error appears in the printed specification of the above numbered patent requiring correction as follows: Page 3, first column, line 6, for "or" read of; page 4, second column, line 26, for the words "weight of" read weight, that is, the weight of; line 29, for the numeral "33.2" read 33.1; page 5, first column, line 39, strike out the syllable "dur-"; line 40, same claim, for "roasting of such" read cooling of the roasted; and that the said Letters Patent should be read with this correction therein that the same may conform to the record of the case in the Patent Office.

Signed and sealed this 2nd day of May, A.D. 1939.

Henry Van Arsdale (Seal)   Acting Commissioner of Patents.

milk shakes, ice cream, gelatin, candy and other products.

We claim:

1. The improvement in the production of solid coffee products from green unroasted coffee beans which comprises subjecting a purified extract from such beans to evaporation to produce a concentrated extract and combining the removal of water from said concentrated extract with the roasting of the product by supplying the concentrated extract in the form of a thin layer to surfaces heated to the roasting temperature, whereby the water is rapidly removed from the concentrated extract and the product thereafter rapidly roasted.

2. The improvement in the roasting of coffee extracts from green unroasted coffee beans which comprises removing water from the purified extracts, carrying out the roasting operation while the material is in a thin layer which is rapidly heated to the roasting temperature, and cooling the roasted product in an atmosphere of regulated humidity.

3. The further improvement in the process of the preceding claim in which both the roasting and the cooling and solidification of the product are carried out in an atmosphere of regulated humidity.

4. The improvement in the production of a roasted product from green unroasted coffee beans which comprises producing and purifying an extract of such beans, evaporating the extract to produce a concentrated extract, supplying the concentrated extract in the form of a thin layer to a surface heated to the roasting temperature to effect rapid removal of water therefrom and rapid roasting of the resulting product, and maintaining a regulated humidity of the atmosphere surrounding said product during the roasting of such product.

5. The improvement in the production of a roasted product from green unroasted coffee beans which comprises producing and purifying an extract of such beans, evaporating the extract to produce a concentrated extract, supplying the concentrated extract in the form of a thin layer to a surface heated to the roasting temperature to effect rapid removal of water therefrom and rapid roasting of the resulting product, and maintaining a regulated humidity of the atmosphere surrounding said product during the cooling of the roasted product, and also during the roasting of such product.

6. The method of producing a coffee extract from raw unroasted coffee beans which comprises extracting the beans with hot water, purifying the resulting hot extract by the addition of adsorbent material capable of adsorbing suspended constituents, separating the resulting purified extract from the adsorbent material and suspended constituents adsorbed thereby, evaporating the resulting solution to produce a concentrated extract, supplying the concentrated extract in the form of a thin layer to surfaces heated to the roasting temperature and thereby rapidly removing water therefrom and roasting the same, and regulating the roasting and subsequent cooling of the roasted product by maintaining a regulated humidity in the atmosphere surrounding said product to produce a roasted and cooled product readily soluble in hot water and substantially free from hygroscopic properties.

7. The improvement in the production of roasted products from green unroasted coffee beans, which comprises extracting raw coffee beans with hot water, evaporating the resulting extract to produce a syrup, and subjecting the resulting syrup to a combined rapid drying and roasting treatment, the insoluble constituents, including fats and oils, being removed from the extract prior to the drying and roasting treatment.

GERALD L. WENDT.
DOUGLAS FRONMULLER.

CERTIFICATE OF CORRECTION.

Patent No. 2,149,876. March 7, 1939.

GERALD L. WENDT, ET AL.

It is hereby certified that error appears in the printed specification of the above numbered patent requiring correction as follows: Page 3, first column, line 6, for "or" read of; page 4, second column, line 26, for the words "weight of" read weight, that is, the weight of; line 29, for the numeral "33.2" read 33.1; page 5, first column, line 39, strike out the syllable "dur-"; line 40, same claim, for "roasting of such" read cooling of the roasted; and that the said Letters Patent should be read with this correction therein that the same may conform to the record of the case in the Patent Office.

Signed and sealed this 2nd day of May, A.D. 1939.

Henry Van Arsdale (Seal) Acting Commissioner of Patents.